(12) United States Patent
Kazawa et al.

(10) Patent No.: US 8,948,595 B2
(45) Date of Patent: Feb. 3, 2015

(54) PASSIVE OPTICAL NETWORK SYSTEM, OPTICAL LINE TERMINAL, AND OPTICAL NETWORK UNIT

(71) Applicant: Hitachi, Ltd., Tokyo (JP)

(72) Inventors: Tohru Kazawa, Kokubunji (JP); Toyomi Teramoto, Yokohama (JP); Makoto Matsuoka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 13/684,484

(22) Filed: Nov. 23, 2012

(65) Prior Publication Data

US 2013/0148972 A1 Jun. 13, 2013

(30) Foreign Application Priority Data

Dec. 7, 2011 (JP) ................................. 2011-267693

(51) Int. Cl.
*H04Q 11/00* (2006.01)
*H04J 14/00* (2006.01)
*H04B 10/27* (2013.01)
*H04B 10/272* (2013.01)

(52) U.S. Cl.
CPC .............. *H04B 10/27* (2013.01); *H04B 10/272* (2013.01); *H04Q 11/0067* (2013.01); *H04Q 2011/0064* (2013.01); *H04Q 2011/0079* (2013.01)
USPC ............................................ 398/67; 398/154

(58) Field of Classification Search
CPC .......................... H04B 10/272; H04Q 11/0067
USPC ..................................................... 398/67, 154
See application file for complete search history.

(56) References Cited

U.S. PATENT DOCUMENTS

| | | | | |
|---|---|---|---|---|
| 5,469,282 | A * | 11/1995 | Ishioka | 398/25 |
| 8,073,329 | B2 * | 12/2011 | Gao et al. | 398/66 |
| 8,208,815 | B1 * | 6/2012 | Chiang et al. | 398/155 |
| 2005/0258941 | A1 * | 11/2005 | Berard | 340/333 |
| 2009/0074406 | A1 * | 3/2009 | Wurst | 398/25 |
| 2009/0263127 | A1 | 10/2009 | Haran et al. | |
| 2010/0272433 | A1 * | 10/2010 | Shaffer et al. | 398/17 |
| 2012/0008937 | A1 * | 1/2012 | Cheng et al. | 398/1 |

FOREIGN PATENT DOCUMENTS

| | | |
|---|---|---|
| JP | 2008-113193 A | 5/2008 |
| JP | 2009-260970 A | 11/2009 |

* cited by examiner

*Primary Examiner* — Nathan Curs
(74) *Attorney, Agent, or Firm* — Volpe and Koenig, P.C.

(57) ABSTRACT

An optical line terminal includes the transmission rate control table for storing a minimum bandwidth for an emergency status for each of optical network units in addition to a maximum assigned bandwidth in a normal status. When a decrease in a supply power is detected, the optical line terminal calculates a transmission clock rate providing a minimum bandwidth required by each optical network unit with reference to the transmission rate control table. The optical line terminal determines change timing of downstream and upstream transmission clock rates, and change timing of upstream data for time-division multiplexing to instruct each of the optical network units. Both the optical line terminal and the optical network unit change the transmission clock rates with substantial synchronization therebetween.

9 Claims, 15 Drawing Sheets

FIG.6

203 Transmission rate control table

| ONU-ID or LLID | Bandwidth upper limit in normal status | Bandwidth upper limit in saving power status | Bandwidth upper limit in power failure |
|---|---|---|---|
| 0001 | 1Gbit/sec | 5Mbit/sec | 0.5Mbit/sec |
| 0002 | 1Gbit/sec | 20Mbit/sec | 2Mbit/sec |
| 0003 | 1Gbit/sec | 5Mbit/sec | 0.5Mbit/sec |
| 0004 | 1Gbit/sec | 5Mbit/sec | 0.5Mbit/sec |
| 0005 | 1Gbit/sec | 5Mbit/sec | 0.5Mbit/sec |

FIG. 7

205 Time stamp control table

| ONU-ID or LLID | Round trip delay time | Bandwidth assigning time section | Transmission permission time section (grant indication) | Downstream switching time section | Upstream switching time section |
|---|---|---|---|---|---|
| 0001 | 100 | 0510 – 0610 | 0410 – 0510 | 0390 – 0410 | 0390 – 0410 |
| 0002 | 200 | 0620 – 0920 | 0420 – 0720 | 0400 – 0420 | 0400 – 0420 |
| 0003 | 200 | 0930 – 1030 | 0730 – 0830 | 0710 – 0730 | 0710 – 0730 |
| 0004 | 100 | 1040 – 1140 | 0940 – 1040 | 0920 – 0940 | 0920 – 0940 |
| 0005 | 100 | 1150 – 1250 | 1050 – 1150 | 1030 – 1050 | 1030 – 1050 |

FIG.9

| | |
|---|---|
| Preamble | 901 |
| Transmission flag | 902 |
| LLID | 903 |
| Transmission destination MAC address | 904 |
| Transmission destination MAC address | 905 |
| Type | 906 |
| Message ID | 907 |
| Corresponding LLID | 908 |
| Downstream transmission clock rate | 909 |
| Downstream switching time start | 910 |
| Downstream switching time length | 911 |
| Upstream transmission clock rate | 912 |
| Upstream switching time start | 913 |
| Upstream switching time length | 914 |
| Padding | 915 |
| FCS | 916 |

Time section (a)

Time section (b)

Time section (c)

FIG. 12A

Time section (a)

| 1201 | 1202 | 1211 | 1201 | 1202 | 1212 | 1201 | 1202 | 1213 | 1201 | 1202 | 1214 | 1201 | 1202 | 1215 |
|---|---|---|---|---|---|---|---|---|---|---|---|---|---|---|
| Vacant block | OH SIG | From-ONU #1 SIG | Vacant block | OH SIG | From-ONU #2 SIG | Vacant block | OH SIG | From-ONU #3 SIG | Vacant block | OH SIG | From-ONU #4 SIG | Vacant block | OH SIG | From-ONU #5 SIG |

10Gbit/sec

FIG. 12B

Time section (b)

| 1201 | 1203 | 1221 | 1201 | 1203 | 1222 | 1201 | 1204 | 1225 | 1201 | 1202 | 1223 | 1201 | 1202 | 1224 |
|---|---|---|---|---|---|---|---|---|---|---|---|---|---|---|
| Vacant block | OH SIG | From-ONU #1 SIG | Vacant block | OH SIG | From-ONU #3 SIG | Vacant block | OH SIG | From-ONU #5 SIG | Vacant block | OH SIG | From-ONU #2 SIG | Vacant block | OH SIG | From-ONU #4 SIG |

10Mbit/sec    100Mbit/sec    1Gbit/sec

FIG. 12C

Time section (c)

| 1201 | 1203 | 1231 | 1201 | 1203 | 1232 | 1201 | 1203 | 1233 | 1201 | 1204 | 1235 | 1201 | 1202 | 1234 |
|---|---|---|---|---|---|---|---|---|---|---|---|---|---|---|
| Vacant block | OH SIG | From-ONU #1 SIG | Vacant block | OH SIG | From-ONU #2 SIG | Vacant block | OH SIG | From-ONU #3 SIG | Vacant block | OH SIG | From-ONU #5 SIG | Vacant block | OH SIG | From-ONU #4 SIG |

10Mbit/sec    100Mbit/sec    1Gbit/sec

PASSIVE OPTICAL NETWORK SYSTEM, OPTICAL LINE TERMINAL, AND OPTICAL NETWORK UNIT

CROSS REFERENCE TO RELATED APPLICATION

The present application is based on Japanese application JP 2011-267693 filed on Dec. 7, 2011, the content of which is hereby incorporated by reference into this application.

BACKGROUND OF THE INVENTION

1. Field of the Invention

The present invention relates to a passive optical network system with a power saving function, an optical line terminal, and an optical network unit.

2. Description of the Related Art

There are increasing demands for a high speed transmission and a broader band communication in network communication. To meet such demands, introduction of optical networks are planed. The Optical network is a network providing a point-to-point communication between an optical line terminal (hereinafter referred to as OLT) and an optical network unit (hereinafter referred to as ONU) through optical fibers. The passive optical network (hereinafter referred to as PON) forms a network providing a star type of point-to-multipoint communication between one OLT and a plurality of the ONUs through an optical fiber and a beam splitter for dividing the optical fiber.

As a typical standard of the PON, there are EPON (Ethernet (registered trade mark) PON) standardized by IEEE802.3 and GPON (Gigabit Capable PON) standardized by ITU-T recommendation G.984.

In the PON, upstream frames transmitted to the OLT from ONU and the downstream frames transmitted from the OLT to the ONU are wavelength-division-multiplexed (hereinafter referred to as WDM). In the downstream frames, the same data is transmitted to all ONUs connected to the OLT with the optical fibers. The ONU having received the data neglects data in frames other than a frame directed to the ONU itself by referring destination information included in the preamble of the data and forwards the data in only the frame directed to the optical network itself to a user side. On the other hand, the upstream frames are multiplexed by Time Division Multiplexing (hereinafter referred to as TDM) in which each ONU transmits the data in a time section individually specified by the OLT.

A communication speed of the PON ranges from a system using a low data rate (speed) such as 64 kbit/sec, to the BPON (Broad band PON) for transmitting and receiving ATM (Asynchronous Transfer Mode) cells having a fixed data length at a maximum 600 Mbit/sec. In addition, the EPON for transmitting and receiving packets of Ethernet having a variable data length at approximately 1 Gbit/sec at maximum, and the GPON using a signal having a higher data rate of about 2.4 Gbit/sec, have been introduced. Hereinafter a higher data rate PON capable of using a signal having data rate of 10 Gbit/sec to 40 Gbit/sec is required to be realized. With increase in the communication rate (speed) in the PON, a power consumption of a relay unit on the transmission path tends to be larger. Because the ONU is installed in a subscriber's house, a lot of ONUs are installed on the network. On the other hand, the ONU requires a shorter time interval of a usable bandwidth than the OLT or an upper rank switch groups. Accordingly, the ONU is left unchanged though the ONU uses a useless power also during non-communication.

As a prior art relating this, JP 2008-113193 discloses a method of reducing the power consumption by setting the functional block inside the ONU to a low power consumption mode when a terminal equipment (TE) is not connected to LAN (Local Area Network) cable. JP2009-260970 discloses a method of transmitting a sleep request from the ONU to the OLT and setting the ONU in a sleep status by a procedure of issuing permission for the request by the OLT.

When a power failure or a power saving are forced by a widespread disaster or a failure, etc. in a power supplying function, the electric power supplying capacity for operating the optical access transmission equipment becomes lack, so that operation of the equipment cannot be maintained. Accordingly, there occurs a state where even minimum communication function, which is really necessary, cannot be provided. Because the communication network is a lifeline for supporting smooth civic life, it is important to meet the communication request in emergency by efficiently using a limited power though it cannot be avoided that a part of functions may decrease in the above-described abnormal state. Particularly, a ratio of electric power consumed by the optical access equipments in the whole of the communication network is large, so that it is important to operate the optical access equipment with a smaller power consumption.

As described above, as a higher speed and a larger capacity communication having been developed, there is an increasing trend in the power consumption of the relay terminal on the transmission line becomes large, In contrast, it can be supposed that decreasing the transmission rate can reduce the power consumption. However, because the existing PON are designed to operate a preset clock frequency, both JP 2008-113193 and JP 2009-260970 do not disclose that the transmission rate is decreased in accordance with the power supplying state. Particularly, it is necessary to avoid a status requiring time for re-transmitting a user signal because a user signal may be dropped out while the transmission rate is switched. In addition, in consideration of differences, for each ONU, in the power supplying state, the capacity of a battery installed in pair with each of the ONUs, a service content supported by the ONU, the number of end users, and the transmission clock, it is desired to change the transmission clock for each ONU.

SUMMARY OF THE INVENTION

An aspect of the present invention provides the passive optical communication system capable of keeping a minimum communication by decreasing the transmission rate in each of ONUs to reduce the power consumption. In addition, an aspect of the present invention provides the passive optical communication system in which the user data does not drop out while the transmission rate is changed.

An aspect of the present invention provides the passive optical network in which a transmission clock rate (speed) is changed synchronously between an OLT and the ONUs forming a PON to decrease the transmission rate for ONUs. More specifically, the OLT may include a storage for storing transmission rate control information in which a minimum bandwidth necessary for an emergency state is stored in addition to a maximum assigned bandwidth in the normal state. When the OLT or the ONU detects a decrease in the supply power, the OLT calculates a transmission clock rate allowing a minimum bandwidth necessary for each ONU to be kept with reference to the transmission rate control information and determine timing of changing the downstream and upstream transmission clocks and transmission timing by time-division-multiplexing of the upstream and down stream data to command each ONU, so that the OLT and the ONU change the transmission clock rate synchronously between the OLT and the ONU.

In the EPON defined in Section 64 of IEEE802.3 ah-2004 standard (hereinafter abbreviated as IEEE802.3 standard), the OLT and ONU perform a synchronous operation by mutually communication of counter values called time stamps. The ONU sets its own time stamp counter to be equalized to the time stamp value transmitted thereto from the OLT. Accordingly, the time stamp counter value in the ONU is delayed from the time stamp counter value in the OLT by a signal transmission delay time from the OLT to the ONU. When a transmitting unit of the OLT changes the downstream transmission clock rate, the signal of which clock rate is changed reaches a receiving unit of the ONU with a signal transmission delay time from the OLT to the ONU. Inversely, when a transmitting unit of the ONU changes the upstream transmission clock rate, the signal of which clock is changed reaches a receiving unit of the OLT with a signal transmission delay time from the ONU to the OLT. If it is assumed that the ONU changes the downstream transmission clock rate and the upstream transmission clock rate to the same data rate at the same time to ease control for an internal circuit of the ONU, the receiving unit of the OLT receives the signal of which the upstream transmission clock rate has been changed at time with a round trip delay time from the change of the downstream clock rate.

While the OLT performs a parallel operation in a plurality of media access units to provide media access control at a plurality of speeds, the OLT switches the media access unit for processing input signals. A switching control unit for this operation performs the control at such timing that a signal transmission delay time for each ONUs is considered. Because the EPON defined in Section 64 of IEEE802.3 standard defines measuring a round trip transmission delay time in which the signal transmission delay time from the OLT to the ONU is added to the signal transmission delay time from the ONU to the OLT with the time stamps, the OLT can generate control timing of the switch control unit by using the round trip transmission delay time for each ONU measured by this manner.

To avoid drop out of the user data while the clock rate is changed, the clock rate change should be done at a time interval for which the communication with the corresponding ONU is not performed. Because the signal receiving circuit in the ONU has assumption that a continuous signal is received, to receive a signal having a different clock rate, it is necessary to cope with the change in the clock rate by switching AGC (automatic gain control) circuits and CDR (clock data recovery) circuits forming the signal receiving circuit and changing control time constants. In addition, there may be a case where it becomes necessary to change a constant of a PLL (phase-locked loop) supplying the clock to the logic LSI (Large Scale Integrated Circuit) for processing the signal. These circuits need time for a lock-in state by several clock cycles at shortest, and about several tens thousands clock cycles at longest to reach stabilization of the signal condition (lock-in state) from the initial state. Then, the OLT interchanges orders of the transmission signals toward each ONU to arrange signals having the same clock rate at the same time for respective ONUs. This decreases a frequency in that signals of which clock rates have been changed are inputted to the receiving unit of the ONU, so that ratio of time interval for lock-in state, which is an invalid time interval, occupying a total transmission interval can be suppressed. In addition, transmitting a non user signals such as a non-signal time interval, an idle signal, or alternation signal of "0" and "1" is transmitted at a border to avoid dropout of the user data by switching the clock rate for time period of the border.

An aspect of the present invention provides a passive optical network system capable of maintaining a minimum necessary communication function for effectively using a restricted electric power in a case where a power failure or a power saving are forced by a widespread disaster or a failure in power supply function.

An aspect of the present invention provides a passive optical network system comprising:

an optical line terminal; and a plurality of optical network units connected to the optical line terminal, wherein the optical network unit comprises:

a detecting unit configured to detect a decrease in supply power to the optical network unit and inform the optical line terminal of the decrease in the supply power when the detecting unit detects the decrease.

a transmission control unit configured to make a change in a transmission rate between the optical network unit and the optical line terminal on the basis of an instruction from the optical line terminal, wherein the optical line terminal comprises:

a storing unit configured to store a transmission rate control information for specifying an upper limit of the communication bandwidth of each of the optical network units in a normal status, a power failure status, and a power saving status; and a time-division-multiplexing control unit configured to instruct each of the optical network units about an upstream transmission timing and an upstream transmission rate of transmitting the data toward the optical line terminal, wherein, when the decrease in the supply power is informed by the optical network unit, the time-division-multiplexing control unit determines transmission clock rates providing communication bandwidths required in the normal status, the power failure status, and the power saving status and a transmission order of the data from each of the optical network units with reference to the transmission rate control information, and transmits a notice message to each of the optical network units to instruct an upstream transmission timing after the change in the transmission rate and an upstream transmission clock rate after the change in the transmission rate.

An aspect of the present invention provides an optical line terminal connected to a plurality of optical network units in a passive optical network system, comprising:

a storing unit configured to store a transmission rate control information for specifying an upper limit of the communication bandwidth of each of the optical network units in a normal status, a power failure status, and a power saving status; and a time-division-multiplexing control unit configured to instruct each optical network unit about an upstream transmission timing and an upstream transmission rate of time-division-transmitting the data from each of the optical network units to the optical line terminal, wherein, when the time-division-multiplexing control unit is informed of the detection of the decrease in supply power by the optical network unit, the time-division-multiplexing control unit determines change in clock rates providing communication bandwidths in the normal status, the power failure status, and the power saving status and a transmission order of the data from each of the optical network units with reference to the transmission rate control information, and transmits a notice message to each of the optical network units to instruct an upstream transmission timing after the change in the transmission clock rate and an upstream transmission clock rate after the change in the transmission clock rate.

An aspect of the present invention provides an optical network unit connected to an optical line terminal in a passive optical network system, comprising:

a detecting unit configured to detect a decrease in a supply power to the optical network unit and inform the optical line terminal of the decrease in the supply power, and a transmission control unit configured to change a transmission rate between the optical network unit and the optical line terminal on the basis of an instruction from the optical line terminal,

BRIEF DESCRIPTION OF THE DRAWINGS

The object and features of the present invention will become more readily apparent from the following detailed description taken in conjunction with the accompanying drawings in which:

FIG. 6 shows a configuration of a transmission rate control table and example data;

FIG. 7 shows a configuration of a time stamp control table and example data;

FIG. 9 is an illustration illustrating a configuration example of a message for commanding a change in a transmission clock rate from the OLT to the ONU;

FIGS. 12A to 12C show a configuration example of an upstream signal transmitted from the ONU to the OLT;

DETAILED DESCRIPTION OF THE INVENTION

With reference to drawings will be described embodiments of the present invention.

In this embodiment, the Ethernet Passive Optical Network (EPON) system defined in IEEE802.3 standard is exemplified. However, the present invention is readily applied to other passive optical network (hereinafter referred to as PON) having a different transmission rate (speed), such as a Gigabit Capable PON (GPON) defined by ITU-T Recommendation G.984 series, XGPON (10 G PON) defined by ITU-T Recommendation G.987 series.

Figure 1:
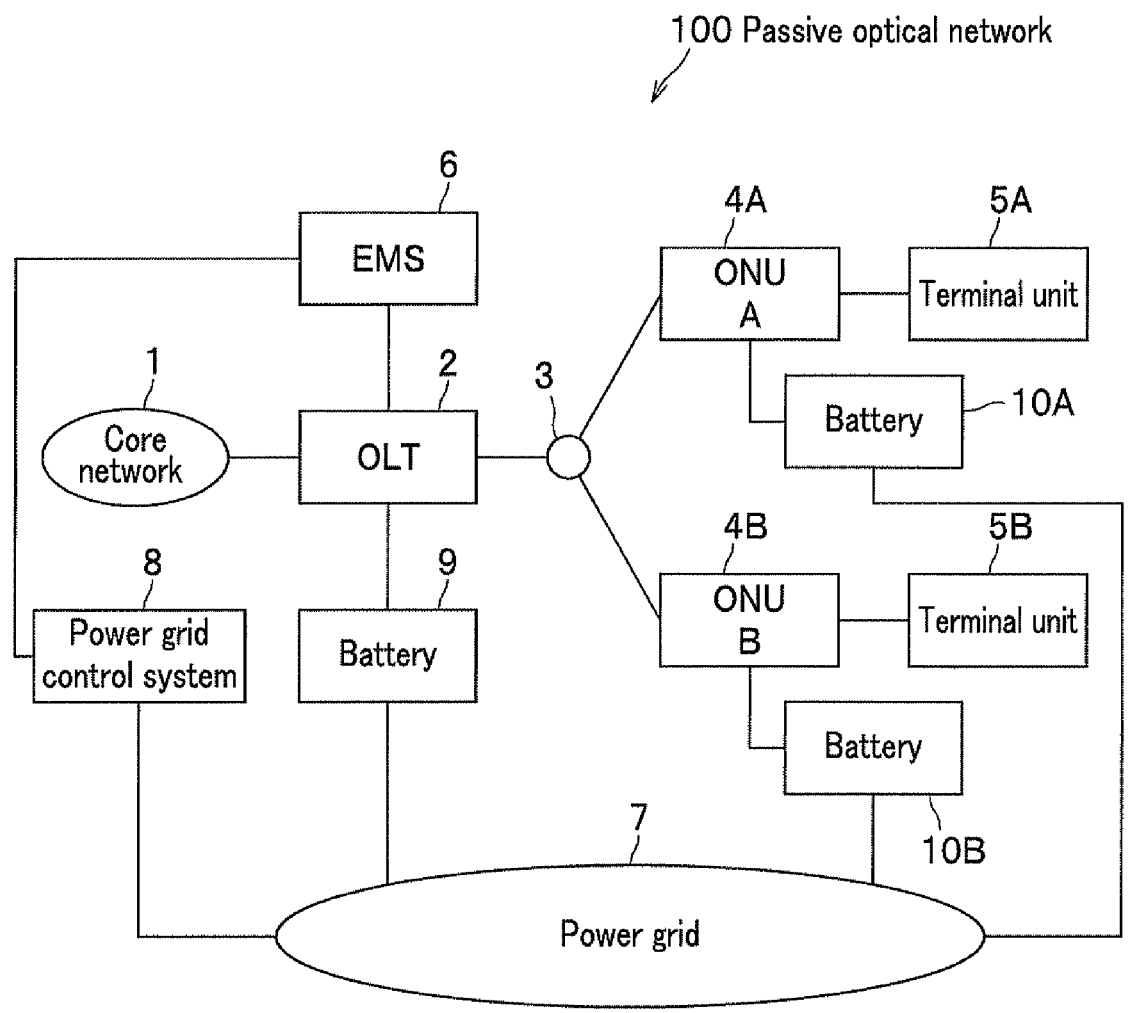
FIG. 1 is a block diagram of a passive optical network (PON) system according to the present invention to show a network configuration example.

FIG. 1 is a block diagram of a passive optical network (PON) system according to the present invention to show a network configuration example.

A passive optical network (PON) system 100 includes an optical line terminal (OLT) 2 and optical network units (ONU) 4 (4A, 4B) connected to the OLT 2 through optical fibers via an optical splitter 3. The OLT 2 is connected to a core network 1. Terminal units 5 (5A, 5B) are connected to the ONUs 4 (4A, 4B), respectively. In FIG. 1, only two ONUs 4 (4A, 4B) and two terminal units 5 (5A, 5B) are shown. However, actually, the OLT 2 is connected to a plurality of ONU 4 more than two via the optical splitter 3. The OLT 2 is connected to an EMS (Element Management System) 6 which is connected to a power grid control system 8. A power grid 7 is connected to the passive optical network 100. The OLT 2 is connected to a battery 9 which is connected to the power grid 7. The OUNs 4A, 4B are connected to the batteries 10 (10A, 10B), respectively. The batteries 10 are connected to the power grid 7. The power grid control system 8 is also connected to the power grid 7. The OLT 2 is connected to a core network 1.

In FIG. 1, the OLT 2 and the ONUs 4 (4A, 4B) communicate with each other using optical signals in which upstream and downstream signals are multiplexed by Wavelength Division Multiplexing (WDV). Accordingly collision between the upstream and downstream signals is avoided. On the other hand, to allow a plurality of the ONUs 4 to perform transmission with the same signal wavelength, the OLT 2 controls by Time Division Multiplexing (TDM) time slots in which each ONU 4 transmits an optical signal without overlaps of the optical signals at the same time.

The battery 9 and the batteries 10 (10A, 10B) are backup power supplies provided for interruption of supply power from the power grid 7 and has functions for observing status of the supply power from the power grid 7 and informing a presence of decrease in the supply power and quantities of remaining stored electricity in the batteries 9 and 10 to the OLT 2 and the ONUs 4 (4A, 4B), respectively. The EMS 6 has a function of remote control of the OLT 2 and the ONUs 4 (4A, 4B) as well as a function of collecting information of presence/absence of a power failure and a power save demand and scheduled time of scheduled planned blackouts to inform the information to the OLT 2.

Figure 2:
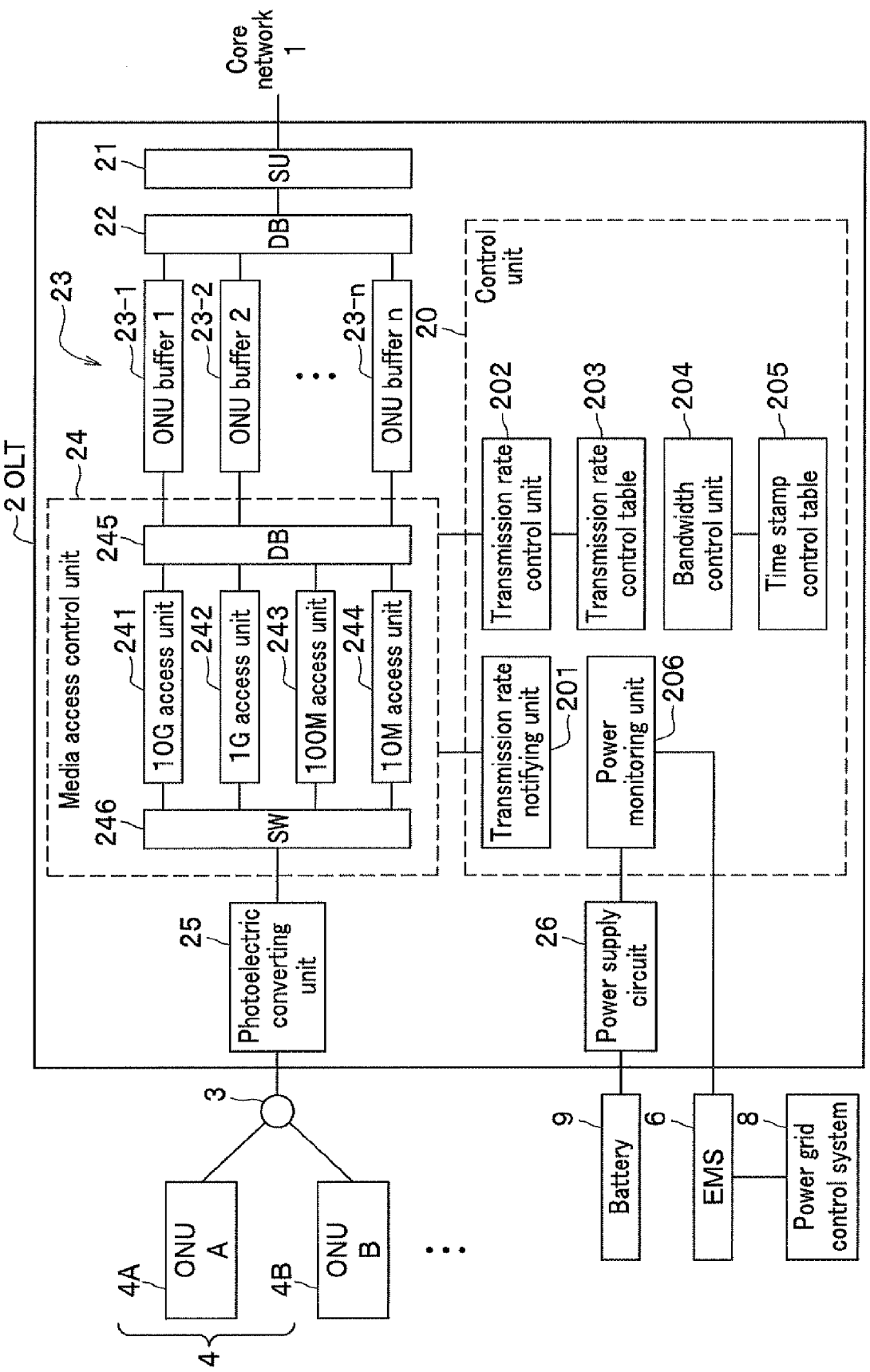
FIG. 2 is a block diagram of an optical line terminal (OLT) to show a configuration example.

FIG. 2 is a block diagram of the OLT 2 to show a configuration example. The OLT 2 includes: a signal transmitting and receiving unit (SU) 21 for communicating with a relay terminal in the core network 1 using electric signals, a distributing unit (DU) 22 connected to the signal transmitting and receiving unit 21; ONU buffers 23 connected to the distributing unit 22; the media access control unit 24, connected to the ONU buffers 23, for controlling data communication while the ONU 4 is operating and sleeping; and the photoelectric converting unit 25, connected to the media access control unit 24 and to the ONUs 4 via the optical splitter 3, for optical communication with the ONUs 4.

The OLT 2 further includes: a control unit (time-division-multiplexing control unit) 20 for controlling the media access control unit 24 in accordance with information from the power supply circuit 26 and the EMS 6.

The ONU buffers 23 (23-1 to 23-n) are connected to the distributing unit (DB) 22.

The control unit 20 includes a transmission rate notifying unit 201, a transmission rate control unit 202, a transmission rate control table (a storage for storing transmission rate control information) 203, a bandwidth control unit 204, a time stamp control table 205, and a power monitoring unit 206.

When the photoelectric converting unit 25 receives an upstream frame through the optical splitter 3, the media access control unit 24 stores an MAC (Media Access Control) address of the upstream frame, and an originating ONU information which are associated with each other which are stored and transmits the upstream frame to the core network 1 via the signal transmitting and receiving unit 21. The originating ONU information is included in a preamble part of the upstream frame. The media access control unit 24 includes four access units, i.e., the 10 G access unit 241 for a process at 10 G bit/sec, the 1 G access unit 242 for a process at 1 G bit/sec, the 100M access unit 243 for a process at 100M bit/sec, and the 10M access unit 244 for a process at 10M bit/sec. A switch unit 246 selects one of the access units to be used under a command from the transmission rate control unit 202. After the process in the selected access units, the upstream frame is transmitted by the signal transmitting and receiving unit 21 to the core network 1 via the distributing unit 245, the ONU buffers 23, and the distributing unit 22.

When the signal transmitting and receiving unit 21 receives a downstream frame from the core network 1, the distributing unit 22 transmits data to one of the ONU buffers 23 corresponding to the MAC address of the downstream frame. The distributing unit (DB) 245 selects the access units having a transmission rate commanded by the transmission rate unit 202. The media access control unit 24 adds to a preamble part of the downstream frame a destination ONU identification information read from routing information previously stored with reference to the MAC address of the downstream frame and transmitted via the photoelectric converting unit 25.

As described later, the transmission rate notifying unit 201 has a function for generating and receiving a message for performing transmission clock change control in synchronization with the each of ONUs (4A, 4B). The transmission rate control unit 202 has a function for changing the transmission clock rate in the media access control unit 24 on the basis of the contents of the transmission rate control table 203. The bandwidth control unit 204 controls timing of changing the transmission clock rate on the basis of the contents of the time stamp control table 205. The power monitoring unit 206 collects power supply information from the battery 9 through the power supply circuit 26 and generates a trigger for a transmission clock rate change process in the transmission rate control unit 202.

Figure 3:
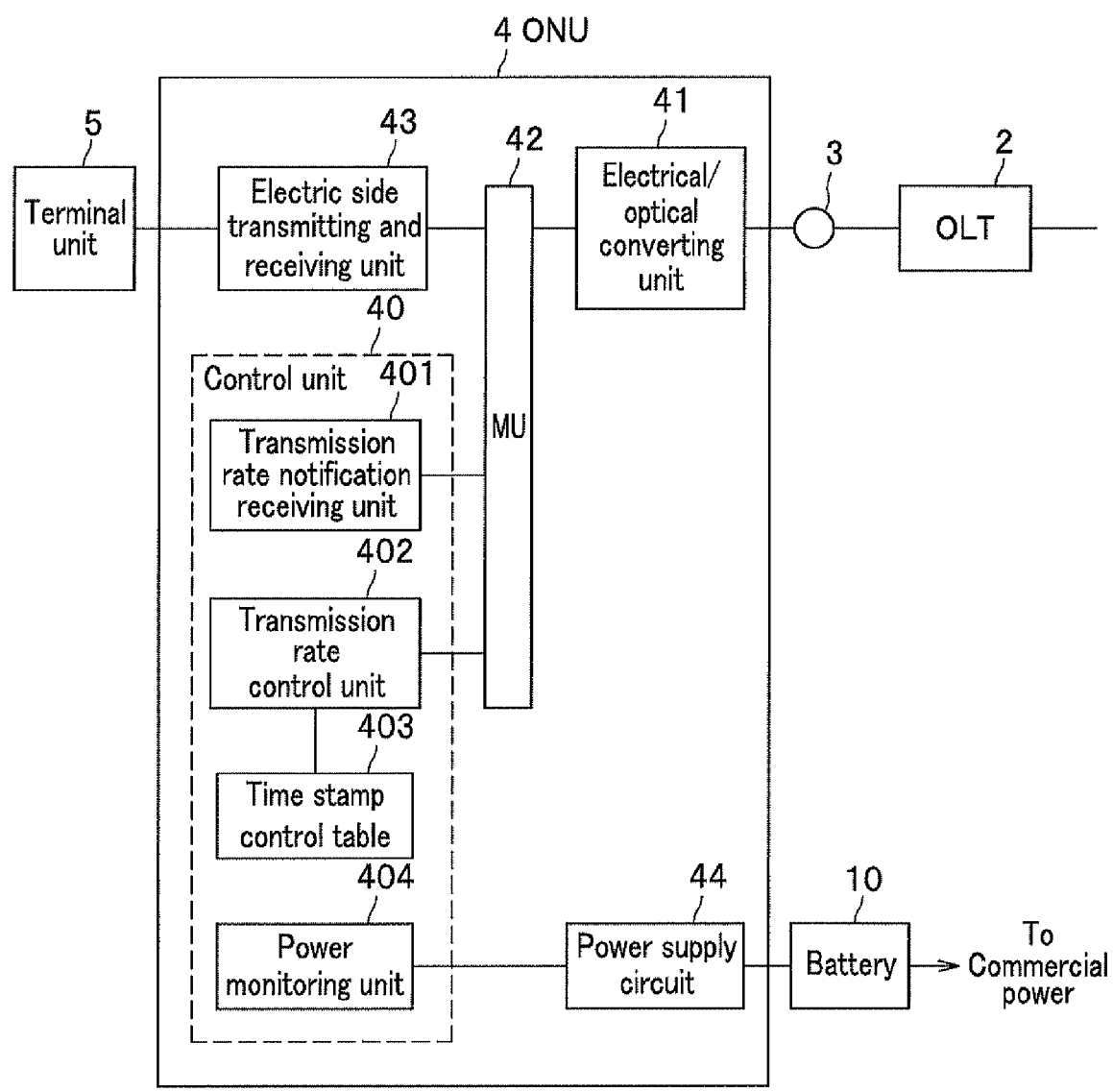
FIG. 3 is a block diagram of an optical network unit (ONU) to show a configuration example.

FIG. 3 is a block diagram of the optical network unit (ONU) to show a configuration example. The ONU 4 includes an electric side transmitting and receiving unit 43 for communicating with the terminal unit 5 with electric signals, a electrical/optical converting unit 41 for communicating with the OLT 2 by optical signals, a media access control unit 42 for controlling data communication while the ONU 4 is operating and sleeping, the control unit 40 for controlling the transmission clock rate changing in the ONU 4, and the power supply circuit 44. The control unit 40 includes a transmission rate notification receiving unit 401, a transmission rate control unit 402, a time stamp control table 403, and a power monitoring unit (detecting unit) 404.

Like the OLT 2, the transmission rate notification receiving unit 401 has a function for receiving a message commanding the transmission clock change control from the OLT 2. The transmission rate control unit 402 has a function for changing the transmission clock rate at timing commanded by the OLT 2 on the basis of the contents of the time stamp control table 403. The power monitoring unit 404 collects the power supply information from the battery 10 via the power supply circuit 44 and informs the state via the media access control unit 42.

Figure 4:
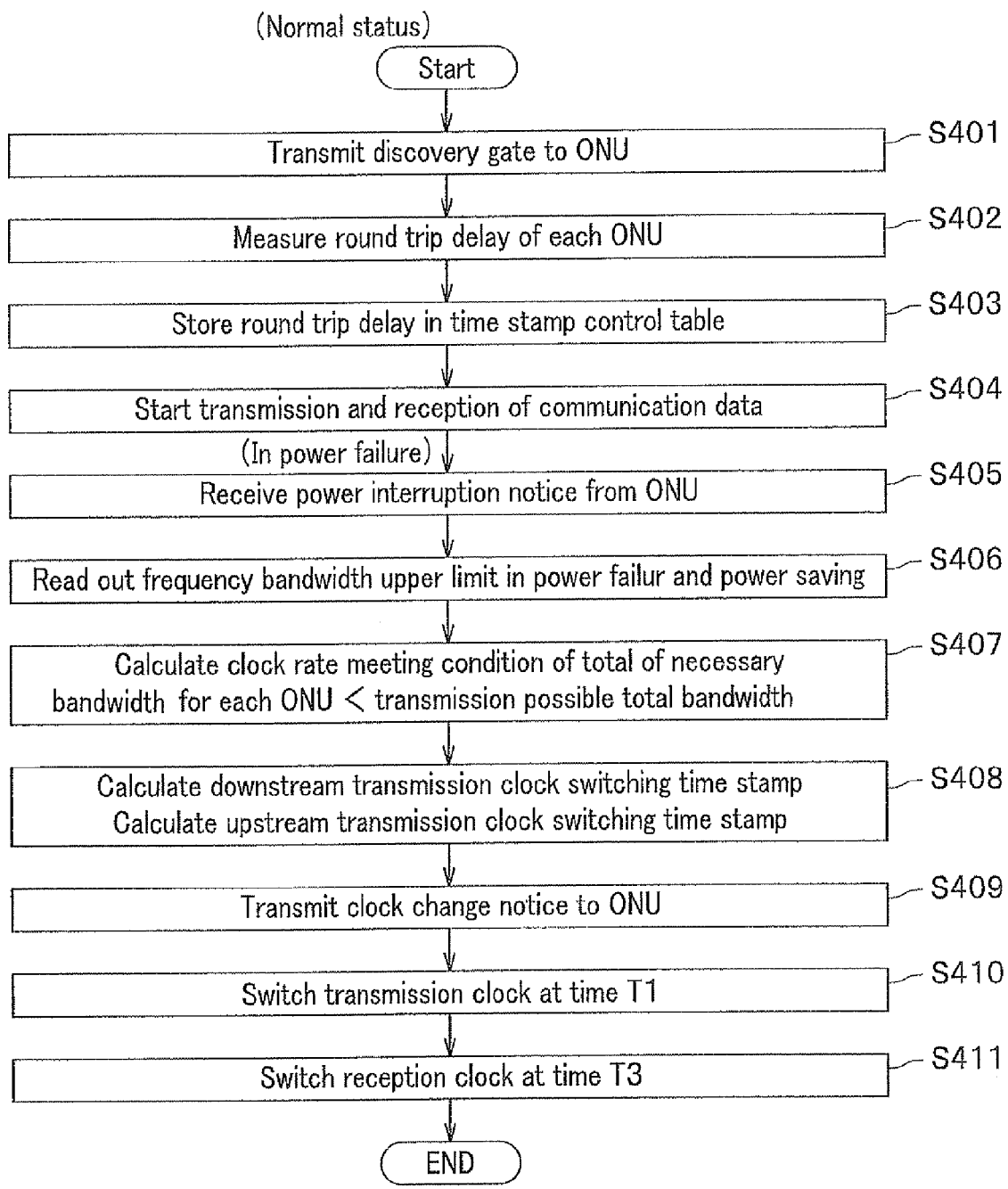
FIG. 4 is a flowchart illustrating a process algorism of the OLT.

FIG. 4 is a flowchart illustrating a process algorism of the OLT 2. As shown in FIG. 4, when the OLT 2 is activated, as defined in Section 64 of IEEE802.3 standard, the OLT 2 transmits a discovery gate to each of the ONUs 4 (step S401), measures a round trip delay time for each of the ONUs (step S402), and stores the measured round trip delay time for each of the ONUs in the time stamp control table 205 (step S403). After that, transmission and reception of the communication data are started, so that user data communication is performed bi-directionally (step S404).

When the OLT 2 receives a power interruption notice from the ONU 4 due to occurrence of a power failure (step S405), the transmission rate control unit 202 reads out from the transmission rate control table 203 the bandwidth upper limit in the power failure and the power saving for each of the ONUs (step S406), and calculates a clock rate meeting a condition of "a total of necessary bandwidths for each ONU<transmission-possible total bandwidth" (step S407). FIG. 6 shows a configuration of a transmission rate control table and example data.

A detailed operation in FIG. 6 will be described later.

Next, the bandwidth control unit 204 calculate transmission clock change timing to be commanded to a plurality of the ONUs 4 and stores the result in the time stamp control table 205 (step S408). FIG. 7 shows a configuration of the time stamp control table 205 and example data. In this example data, values are shown in the decimal notation.

The time stamp control table 205 includes for each of ONU-IDs (Identification) or LLID (Logical Link Identification): a column for storing the measured round trip delay time; a column for storing a bandwidth assigning time section at a receiving timing by the OLT 2 represented by values of the time stamp described earlier; a column for storing time sections indicated by the time stamp values for supplying an upstream signal transmission grant (grant indication) with the gate message defined in Section 64 of IEEE802.3 standard; a column for storing switching time sections for the downstream transmission clock rate indicated by the time stamp values; and a column for storing switching time sections for the upstream transmission clock rate indicated by the time stamp values.

Figure 8:
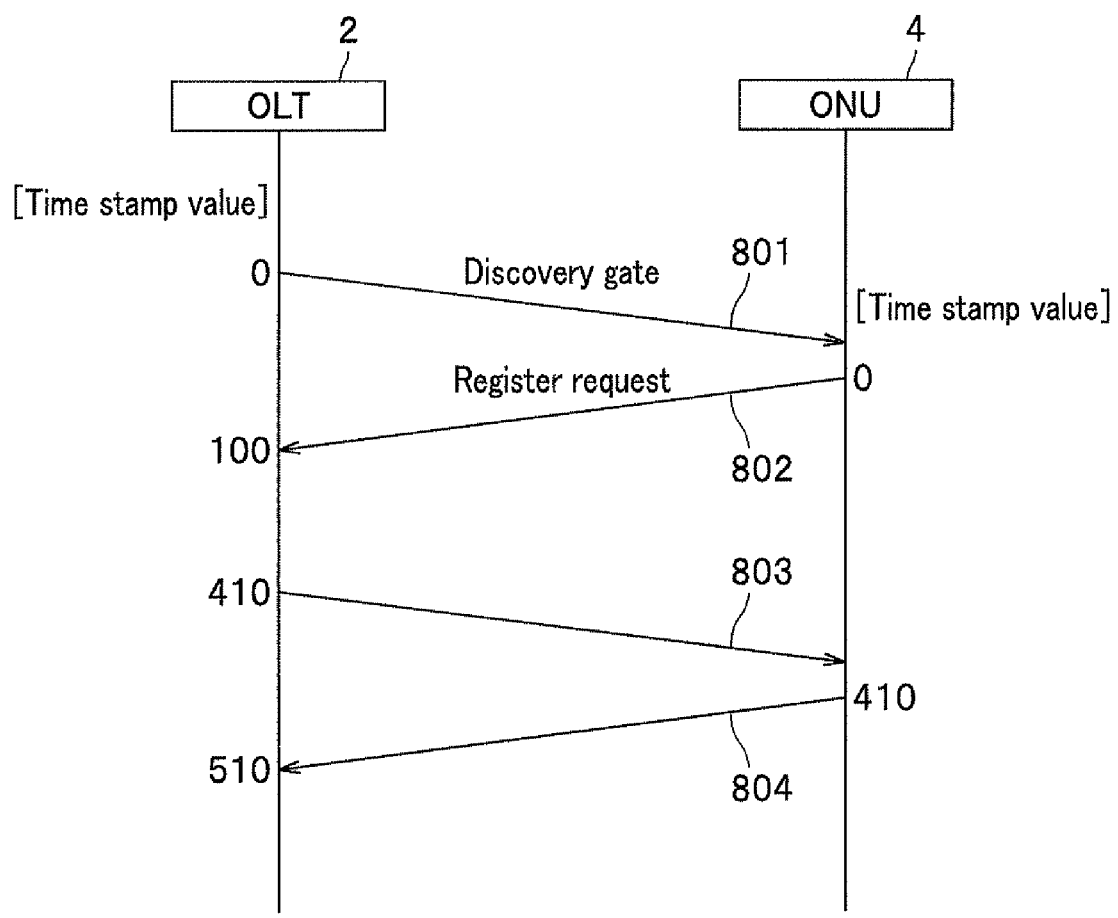
FIG. 8 is a sequence diagram to describe a signal transmission delay between the OLT and the ONU.

With reference to FIG. 8, will be descried a relation between the bandwidth assigning time section and the time section for supplying an upstream signal transmission grant which is to be sent to each of the ONUs 4 as a command. In this example, it is assumed that one-way transmission delay time between the OLT 2 and the ONU 4 is "50" in the time stamp value notation and a round trip delay time is 100 in the time value notation. The OLT 2 broadcasts a message of a discovery gate 801 to the ONUs 4 when being activated or only the 4 is newly activated. The ONU 4 receiving the discovery gate 801 returns a register request 802 immediately. In this exchange of messages, all messages include time stamp value therein. The discovery gate 801 is transmitted when the time stamp value of the OLT 2 is zero, and the time stamp value stored in the message is also zero. In this example, the discovery gate 801 is received by the ONU 4 after a time period of "50" in the time stamp notation. The ONU 4 stores the time stamp value of "0" stored in the received discovery gate 801 in a counter therein as its own time stamp value. Immediately, the ONU 4 returns a register request 802 storing its own time stamp value of "0". The register request 802 is received by the OLT 2 after a time period of "50" in the time stamp value notation. At that time, the time stamp value of the OLT 2 becomes "100".

Accordingly, the OLT 2 should give the grant indication, being a transmission permission signal, to the ONU 4 at the time stamp time when the time stamp value is smaller than the time stamp value of the time stamp time when the OLT 2 want to receive the signal by a round trip delay time of "100" in the time stamp notation in order that the OLT 2 can start signal transmission. For example, in order that the OLT 2 can receive the signal 804 when the time stamp value is "0510" (decimal), the OLT 2 should command with a signal 803 directed to the ONU 4 so that the ONU 4 transmits the signal when the time stamp value is "0410 (decimal).

Description about FIG. 7 will be continued based on the description above. FIG. 7 shows a data example in the case where the bandwidth control unit 204 determined that change completion time of the upstream transmission clock rate is at the time should be "0510" (decimal) the time stamp value and a change allowable time width is "0020" (decimal). The time width of "0020" (decimal) corresponds to 320 nsec which is an allowable time width even for current technology receivers. In other words, in this example, the change of the upstream transmission clock rate is to be completed while the time stamp value is from "0490" (decimal) to "0510" (decimal) in the OLT 2. In the following description, "(decimal)" after the time stamp value will be omitted.

Because there is transmission delay between the OLT 2 and the ONU 4, in order that the OLT 2 can receive the signal at time when the time stamp value is "0490", the ONU 4 should to start transmitting the signal at earlier time by the round trip delay time in the time stamp value notation. In a case of the ONU#1, (an optical network unit having (ONU-ID=0001), it is allowed that the transmission clock rate is changed from the time when the time stamp value at the ONU#1 is "0390" to the time when the time stamp value there of "0410" and successively data transmission is to be started.

Subsequently, the bandwidth control unit 204 sets the changing timing of the downstream transmission clock to a value which is same as that of the changing timing of the upstream transmission clock of each of the ONUs 4 and then, informs each ONU 4 of this value. The time when the downstream transmission clock is changed at the OLT 2 is time when the time stamp value is "0390", which is the earliest start time in the downstream switching time sections shown in FIG. 7. It is noted that in this example, it is assumed that both upstream and downstream transmission clocks of each ONU 4 are set to be the same rate between the upstream and the downstream.

Following this, the transmission rate notifying unit 201 in the OLT 2 starts transmitting the clock change notice to the ONU 4 (step S409). FIG. 9 shows a configuration example of the clock change notice message from the OLT to the ONU. In FIG. 9, the clock change notice message includes a preamble 901, a transmission flag 902, a LLID 903, a transmission destination MAC address 904, a transmission source MAC address 905, a type 906, a message ID 907, a corresponding LLID 908, a downstream transmission clock rate 909, a downstream switching time start 910, a downstream switch length 911, an upstream transmission clock rate 912, an upstream switching time start 913, an upstream switching time length 914, a padding 915, and an FCS (Frame Check Sequence) 916. Because this configuration is based on the format of GATE message which is a signal transmission permission message defined in Section 64 of IEEE802.3 standard, it may be periodically transmitted in phase with a bandwidth control period, or transmitted only when the clock rate is changed. A plurality of information pieces of references 908 to 912 may be included in the same message to be sent to different LLIDs, i.e., different ONUs, or sent to the same LLID, i.e., to the same ONU at different timings.

In the data example in FIG. 7, values in the downstream transmission clock rate 909 and the upstream transmission clock rate 912 are the same clock rate determined in the above-described step S407. A value of the downstream switching time start 910 directed to the ONU#1 is set to "0390", a value of the downstream switch length 911 directed to the ONU#1 is set to "0020", a value of the upstream switching time start 913 directed to the ONU#1 is set to "0390", and a value of the upstream switching time length 914 directed to the ONU#1 is set to "0020", respectively, which are transmitted to LLID=0001 (ONU#1).

Next, the OLT 2 switches the transmission clock at time T1 when the time stamp value is "0390" about which the OLT 2 instructed the ONU#1 (step S410) and switches the reception clock within the time width of "0020" in the timestamp notation from time T3 indicated by the time stamp value of "0490" (step S411) to restart receiving the upstream data.

Figure 5:
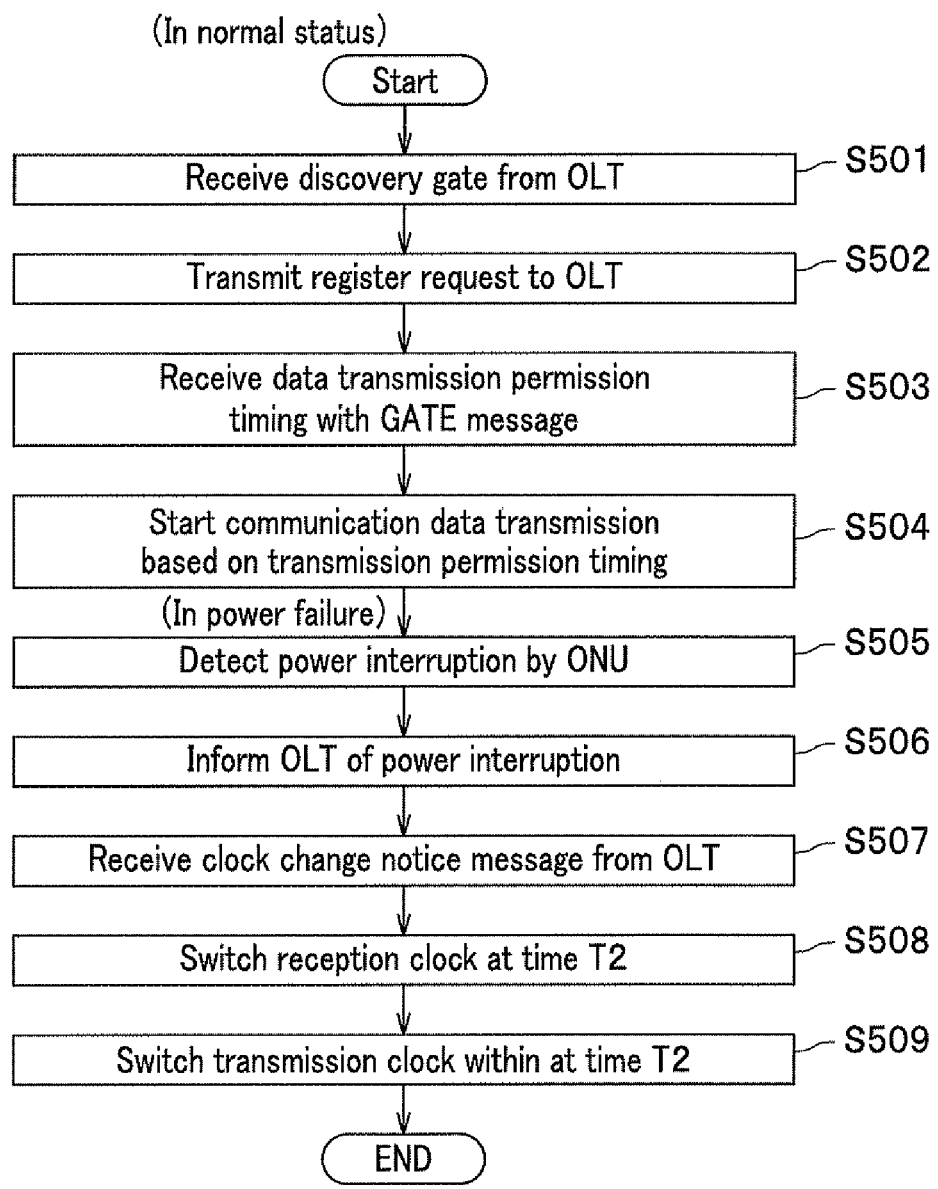
FIG. 5 is a flowchart illustrating a process algorism of the ONU.

FIG. 5 is a flowchart illustrating a process algorism of the ONU 4. When receiving the discovery gate from the OLT 2 as defined in Section 64 of IEEE802.3 standard (step S501), the media access control unit 42 of the ONU 4 transmits a register request used to measure the round trip delay time of each ONU (step S502), receives data transmission permission timing with the GATE message (step S503), and starts communication data transmission on the basis of the received transmission permission timing (step S504).

When the ONU 4 detects a power interruption caused by an occurrence of a power failure (step S505), the ONU 4 informs the OLTs 2 of the power interruption (step S506). As the message for this, Dying Gasp message defined in Section 57 of IEEE802.3 standard is applicable. Next, the transmission rate notification receiving unit 401 receives the above-described clock change notice message from the OLT 2 (step S507) and switches the reception clock within the time width of "0020" from time T2 ("0390" in the example of the ONU#1 in FIG. 7) (step S508), at the same time, switches the transmission clock within the time width of "0020" from time T2 ("0390" in the example of the ONU#1 in FIG. 7) of the upstream switching time start indicated by the clock change notice message (step S509).

Figure 10:
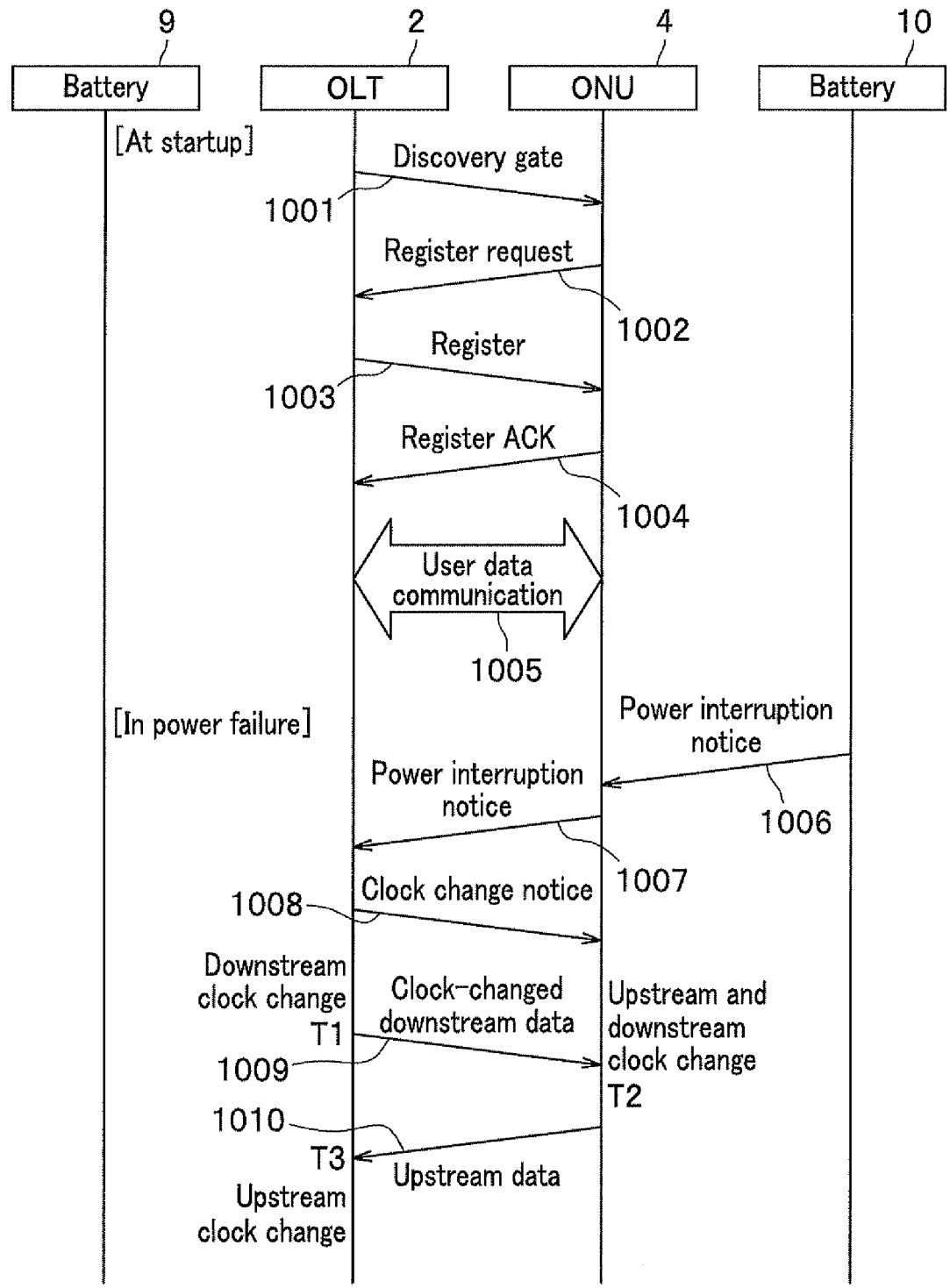
FIG. 10 is a sequence diagram to describe the change in the transmission clock rate provided by cooperative operation between the OLT and the ONU.

FIG. 10 is a sequence diagram to describe a change in the transmission clock rate provided by a cooperative operation of the OLT 2 and the ONU 4. At a startup, the OLT 2 transmits a discovery gate 1001. The ONU 4 having received the discovery gate 1001 transmits a register request 1002. The OLT 2 having received the register request 1002 transmits a register 1003. The ONU 4 having received the register 1003 transmits a register ACK 1004. After this, user data communication 1005 is performed between the OLT 2 and the ONU 4. These are sequences of an ONU registration and a communication start defined in Section 64 of IEEE802.3 standard. In this process the round trip delay time between the OLT 2 and the ONU 4 is also measured.

The battery 10 transmits a power interruption notice 1006 to the ONU 4 which transmits a power interruption notice 1007 to the OLT 2 which is a trigger for process performed when a power failure occurs. In response to this, OLT 2 transmits a clock change notice 1008, using the message described regarding FIG. 9. The OLT 2 transmits downstream data 1009 of which clock rate has been changed at time T1. The ONU 4 transmits an upstream data 1010 of which clock rate has been changed at time T2. The OLT2 receives the upstream data 1010 at time T3. From time T1 to T3 in these processes are the same as those described above.

Figure 11A:
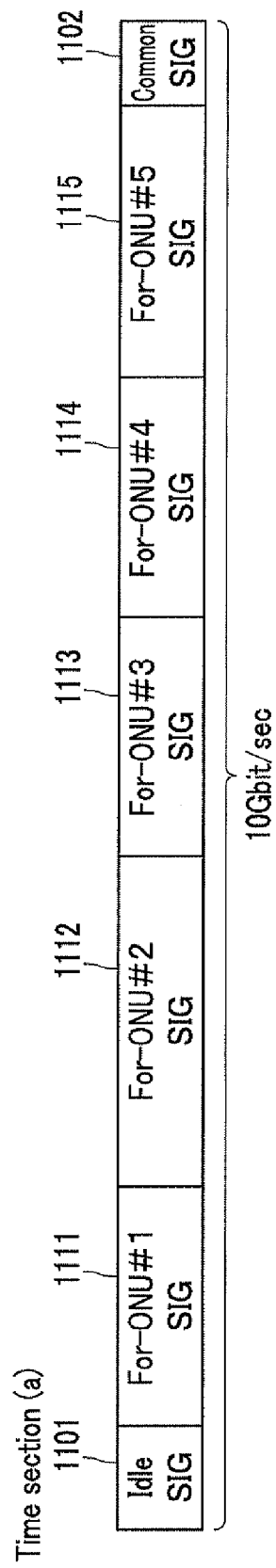
FIGS. 11A to 11C show a configuration example of a downstream signal transmitted from the OLT to the ONU.
Figure 11B:
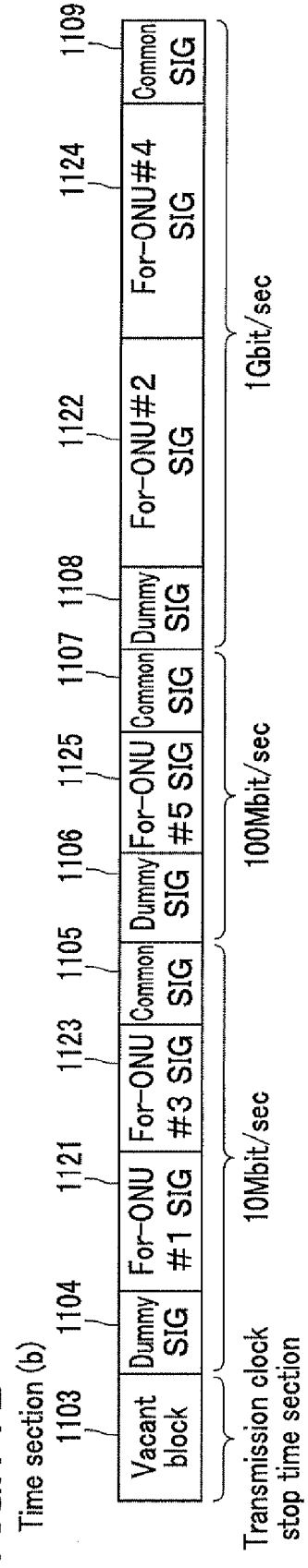
Figure 11C:
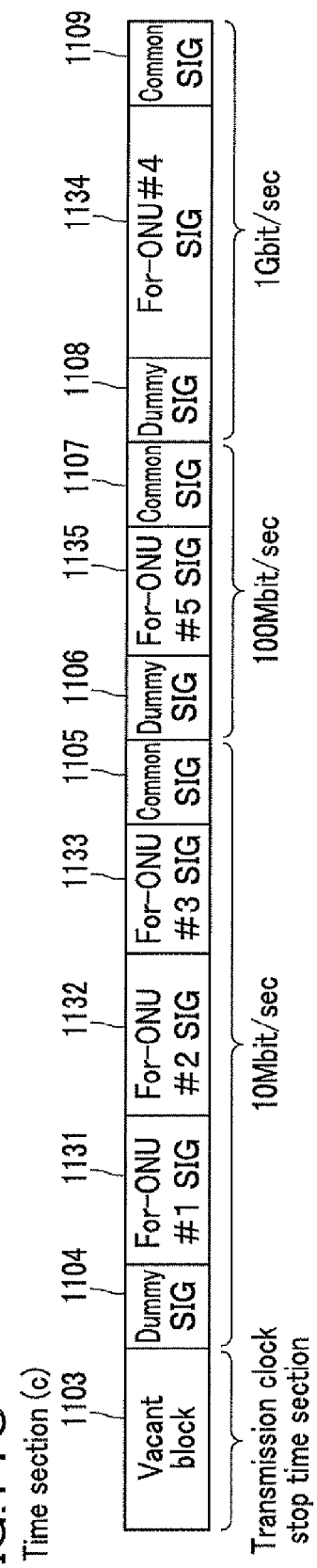
Figure 13:
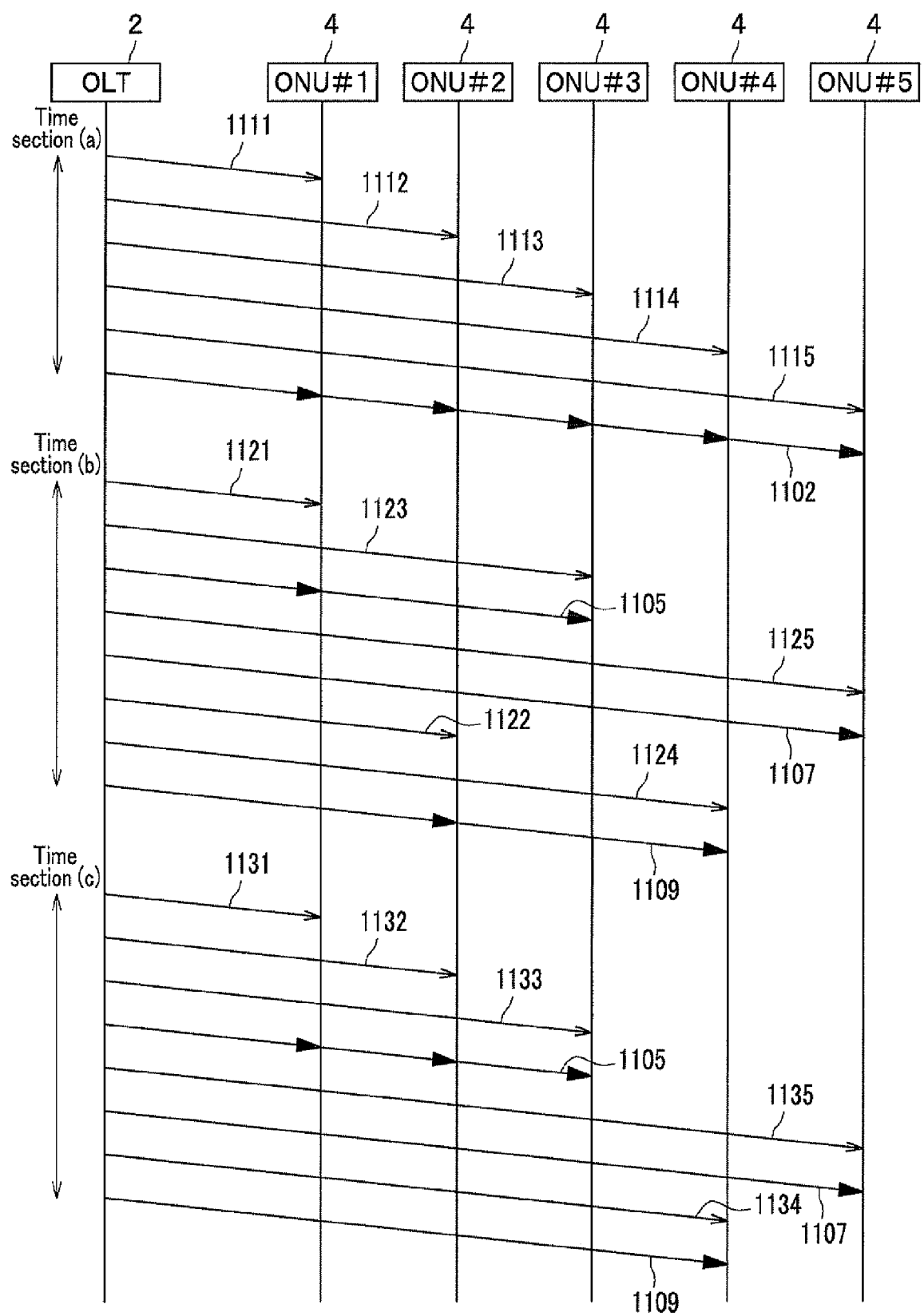
FIG. 13 is a sequence diagram to illustrate an example operation of changing a downstream transmission clock rate.

FIGS. 11A to 11C show examples of downstream transmission signals transmitted by the OLT 2 to five ONUs (ONU#1 to OUN#5) 4 corresponding to the data examples in FIGS. 6 and 7. FIG. 13 is a sequence diagram of a change operation example of the downstream transmission clock rate when the downstream transmission signals in FIGS. 11A to 11C are transmitted. In FIG. 13, common signals are represented with solid tip arrows. In FIGS. 11A to 11C and 13, a time section (a) is in a normal status with no restriction in the supply power, and signals 1111, 1112, 1113, 1114, and 1115 respectively going to ONU#1, ONU#2, ONU#3, ONU#4, and ONU#5, and an idle signal 1101 and common signal 1102 are all transmitted at 10 Gbit/sec.

The idle signal 1101 is an idle part signal superimposed into a remaining time period because a transmission data quantity for the time section (a) is smaller than a transmission capacity of 10 Gbit/sec. The common signal 1102 includes control information to be broadcasted to all ONUs 4 and a multi-cast signal.

A time section (b) is in a status in which a part of the ONUs detect restriction in the supply power. More specifically, because power monitoring units 404 of the ONU#1 (LLID=0001) and the ONU#3 (LLID=0003) detect power supply interruption information from the battery 10, and quantities of remaining stored electricity in the batteries 10 are smaller than a certain level limited, the transmission rate control unit 202 instructs to have the downstream transmission clock rate at 10 Mbit second to secure the bandwidth for power failure shown in FIG. 6. In addition, the ONU#5 (LLID=0005) also detects the power supply interruption information. However, because the quantity of the remaining stored electricity is still large, the transmission rate control unit 202 of the OLT 2 determines the downstream transmission clock rate to be 100 Mbit/sec and outputs an operation instruction to maintain a bandwidth for a power saving shown in FIG. 6. The ONU#2 (LLID=0002) and ONU#4 (LLID=0004) do not detect the power supply interruption information. However, the transmission rate control unit 202 of the OLT 2 determines the downstream transmission clock rate as 1 Gbit/sec and outputs an operation instruction to maintain the bandwidth within the range of 1 Gbit/sec.

In determining the downstream clock rate, it is assumed that basically, a transmission clock rate of 10 Mbit/sec is assigned for an operation in a power failure; a transmission clock rate of 100 Mbit/sec, for a power saving operation; and a transmission clock rate of 1 Gbit/sec, for general operation. However, because when the transmission clock rate is decreased, a quantity of data capable of being transmitted becomes lower, it is necessary to check whether a transmission clock rate is selected so as to ensure the upper limit of the bandwidth in a power failure and for a power saving operation. In this example, a total of the used bandwidths of three OLTs 2 (ONU#1, ONU#3, ONU#5) operating in modes of a power failure and a power saving in conversion to 10 Gbit/sec is given by:

0.5 Mbit/sec×1000+0.5 Mbit/sec×1000+5 Mbit/sec× 100=1.5 Gbit/sec

Because (1.5 Gbit/sec<10 Gbit/sec) can be established, the upper limits of the bandwidths of three ONUs can be ensured during a power failure and a power saving. When three ONUs fully use the bandwidths up to the upper limits, remaining bandwidths which can be used by two ONUs 4 (ONU#2, ONU#4) for the normal operations is given by:

10 Gbit/sec−1.5 Gbit/sec=8.5 Gbit/sec

In the operation with the clock of 1 Gbit/sec, the communication rate of 850 Mbit/sec is shared by two ONUs. Because 1 Gbit/sec, which is an upper limit of the bandwidth in a normal status, is a maximum value in a best effort service, a bandwidth of about a half of the upper limit can be ensured, this setting of the transmission clock rate can be determined to be proper. When the inequality does not established, or when the remaining bandwidth for the ONUs in general operation is too small, the upper limit of the bandwidth for each ONU is further restricted or inversely, a decrease ratio of the transmission clock rate is decreased to secure the total bandwidth allowing transmission.

In the time section (b) in FIG. 11B, a for-ONU#1 signal 1121 going to the ONU#1 and a signal 1123 going to the ONU#3 are combined into a sequence, and synchronization with a receiving clock of 10 Mbit/sec is performed in a period of a dummy signal 1104 just after a vacant block 1103.

Next, a for-ONU#5 signal 1125 going to the ONU#5 is transmitted just after a dummy signal 1106 with a common signal 1107 at a 100 Mbit/sec. In addition, the for-ONU#2 signal 1122 going to the ONU#2 and a for-ONU#4 signal 1124 going to the ONU#4 are combined into a sequence, and a receiving clock of 1 Gbit/sec is synchronized during a dummy signal 1108. After the signal 1124, a common signal 1109 is transmitted. Transmission timing of these dummy signals are equalized to the timing specified by the downstream switching time start 910 and the downstream switching time start 910 in FIG. 9. As described above, combining the signals having the same clock rate avoids overlap of the dummy signals to enhance the downstream transmission efficiency. The common signals 1105, 1107, and 1109 are attached to each sequence of corresponding transmission clock rate. The signal to be broadcasted to all ONUs is copied for each of the transmission clock rates and forwarded in each time slot of the common signals 1105, 1107, and 1109.

A time section (c) is in a status in which the ONU#2 further detects a restriction in the power supply in the status of the time section (b), and the OLT 2 instructs the ONU#2 to do the power failure operation. Also the ONU#2 is specified to use transmission clock rate of 10 Mbit/sec, and thus a for-ONU#1 signal 1131, a forONU#2 signal 1132, and a for-ONU#3 signal 1133 are combined into a sequence, and receiving clock synchronization toward the 10 Mbit/sec is made during the dummy signal 1104. A for-ONU#5 signal 1135 is transmitted following to a dummy signal 1106 for synchronization of the receiving clock of 10 Mbit/sec. A for-ONU#4 signal 1134 is transmitted following to a dummy signal 1108 for synchronization of the receiving clock of 1 Gbit/sec. The common signals 1105, 1107, and 1109 are transmitted similarly to the time section (b). In this case a total of used bandwidth in conversion to 10 Gbit/sec of four ONUs (the ONU#1, the ONU#2, the ONU#3, the ONU#5) performing the power failure operation and the power saving operation is given by:

0.5 Mbit/sec×1000+2 Mbit/sec×1000+0.5 Mbit/sec× 1000+5 Mbit/sec×100=3.5 Gbit/sec Thus 3.5 Gbit/sec<10 Gbit/sec is established. This also ensures the upper limit of the bandwidths for the four ONUs during the power failure and power saving. When these four ONUs fully use all the bandwidths up to the upper limits, remaining bandwidths which can be used by four ONUs for the general operations is given by:

10 Gbit/sec−3.5 Gbit/sec=6.5 Gbit/sec

Thus, in the 1 Gbit/sec clock operation, 650 Mbit/sec can be used. Accordingly, like the former operation, this setting of the transmission clock rate can be determined to be proper.

Figure 14:
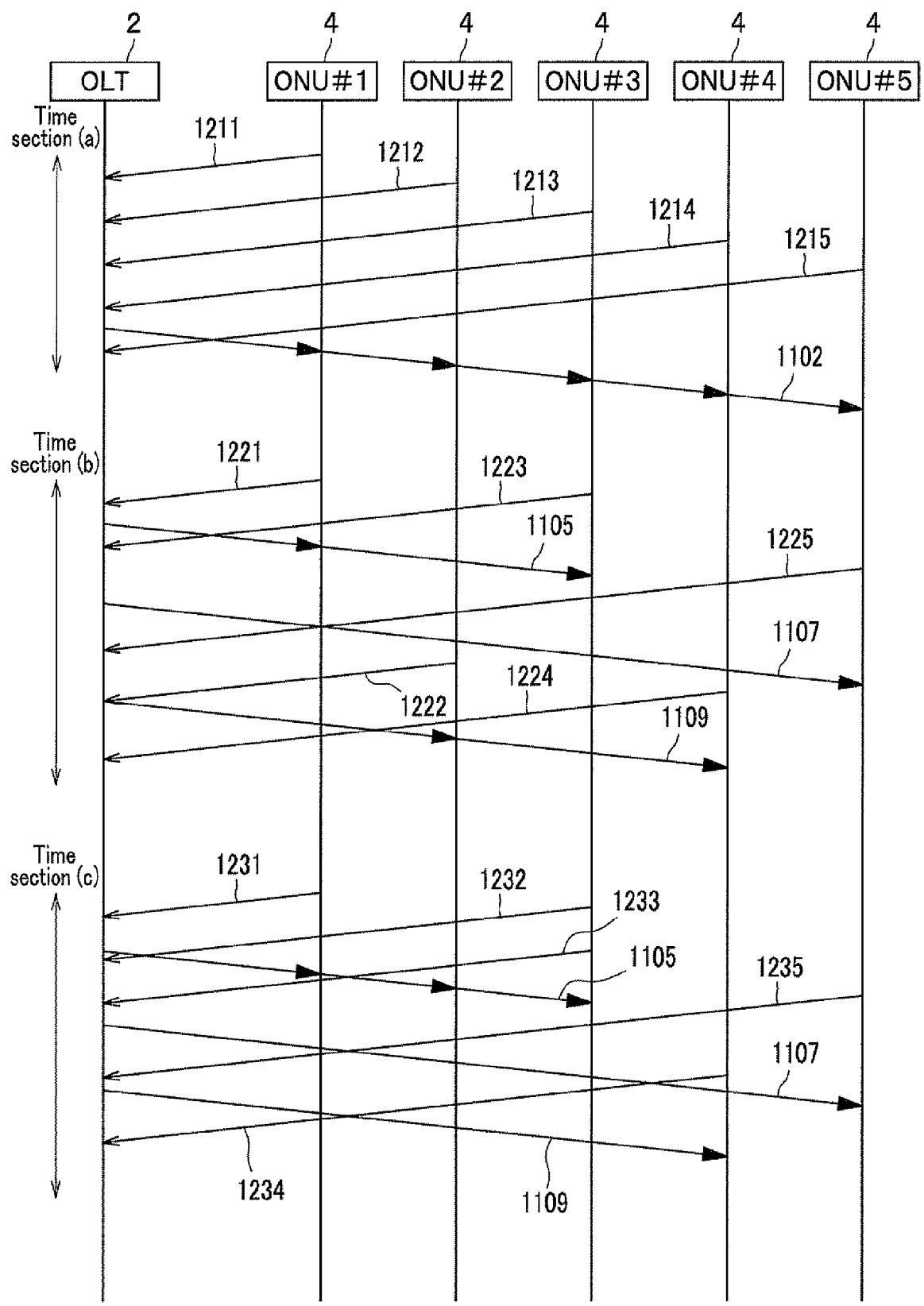
FIG. 14 is a sequence diagram to illustrate an example operation of changing an upstream transmission clock rate.

FIGS. 12A to 12C show a configuration example of an upstream signal transmitted from these five ONUs (ONU#1 to #5) to the OLT 2. FIG. 14 is a sequence diagram to illustrate an example operation of changing an upstream transmission clock rate with the configuration example. Arrows in FIG. 14 are designated with the same references used in FIGS. 12A to 12C. The upstream transmission has differences from the above-described case of the downstream signal in that each of overhead (OH) signals (1202, 1203, and 1204) for the transmission clock synchronization for each signal transmitted from each ONU 4 and that there is no common signal in the upstream transmission signal. The overhead signal OH is transmitted just after vacant blocks 1201. Other operations are the same as these in the case of the downstream transmission signal. In FIG. 14, the GATE message defined in Section 64 of IEEE802.3 standard, which is an upstream transmission permission signal to the ONU 4, is included in the common signals 1102, 1105, 1107, and 1109. The upstream transmission signals (a from-ONU#1 signal 1221, a from-ONU#2 signal 1222, a from-ONU#3 signal 1223, a from-ONU#4 signal 1224, and a from-ONU#5 signal 1225) are transmitted in the time section (b) on the basis of the GATE message included in the common signal 1102 transmitted in time section (a). The upstream transmission signals (a from-ONU#1 signal 1231, a from-ONU#2 signal 1232, a from-ONU#3 signal 1233, a from-ONU#4 signal 1234, a from-ONU#5 signal 1235) are transmitted in the time section (c) on the basis of the GATE messages included in the common signals 1102, 1105, 1107, and 1109 transmitted in the time section (b). The upstream transmission signal is transmitted in the time section (c) on the basis of the GATE message included in the common signals 1105, 1107, and 1109 transmitted in the time section (b). In addition, a Gate message necessary for transmitting the upstream transmission signals (a from-ONU#1 signal 1211, a from-ONU#2 signal 1212, a from-ONU#3 signal 1213, a from-ONU#4 signal 1214, a from-ONU#5 signal 1215) in the time section (a), is included in the common signal (not shown) transmitted by the OLT 2 just before the time section (a).

Figure 15:
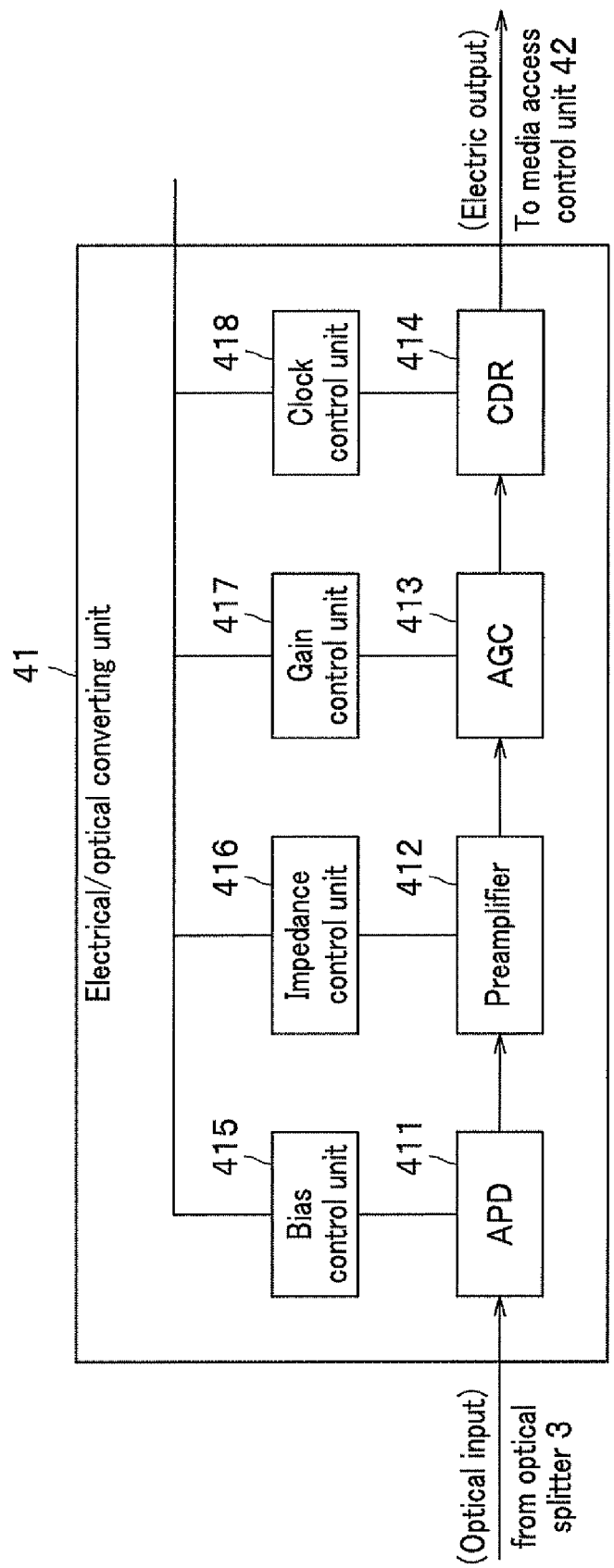
FIG. 15 is a block diagram to illustrate a configuration example of a downstream signal receiving circuit in an optical the photoelectric converting unit in the ONU.

FIG. 15 is a block diagram to illustrate a configuration example of a downstream signal receiving circuit in an optical the electrical/optical converting unit 41 in the ONU 4. The electrical/optical converting unit 41 is configured to include a downstream signal receiving unit and an upstream signal transmitting unit. However, in FIG. 15 only the downstream signal receiving unit is illustrated in detail. The electrical/optical converting unit 41 includes the APD (Avalanche Photo Diode) 411, a preamplifier 412, an AGC (Automatic Gain Controller) 413, a CDR (Clock and Data Recovery) 414, a bias control unit 415, an impedance control unit 416, a gain control unit 417, and a clock control unit 418.

The bias control unit 415 controls a gain in converting an optical input into an electric output by controlling a bias voltage supplied to the APD 411. It is necessary to select an appropriate value of the gain in accordance with the value of the transmission clock rate, and this control is performed by the bias control unit 415. The impedance control unit 416 controls an impedance value of a transformer in the preamplifier 412 to control a ratio of a part of the input current into the preamplifier 412 converted into the output voltage. It is necessary to select an appropriate value of the transform impedance in accordance with the transmission clock rate. The impedance control unit 416 performs the control. The gain control unit 417 is a unit for controlling the gain in the AGC 413 by controlling a ratio between the input voltage and the output voltage of the AGC 413. It is also necessary to select an appropriate value for the gain of the AGC 41 in accordance with the value of the transmission clock rate, and thus the gain control unit 417 performs the control. The clock control unit 418 extracts a sampling clock from the input signal by the CDR 414 to control the clock frequency in identifying the data to be equalized to the transmission clock rate.

The bias control unit 415, the impedance control unit 416, the gain control unit 417, the clock control unit 418 are controlled by the media access control unit 42 within a time width specified by the downstream switching time start 910 and the downstream change length 911 in FIG. 9. It is desired to stop the control operation for the time period other than the time period specified by the downstream switching time start 910 and the downstream switching length 911 to avoid an erroneous operation for time period while a signal having a different clock rate which is different from the transmission clock range to be received by its own ONU.

In the above-described embodiment, there are communication bandwidths required in the normal status, the power failure status, and the power saving status, and the transmission rate is changed when the detecting unit 404 detects the decrease in a supply power. However, because the power failure status can be considered as a kind of the power saving status, the power failing status can be included in the power saving status and omitted.

Therefore, there may be provided a passive optical network system 100 comprises: an optical line terminal 2, connected to a core network 1, including a transmitting and receiving device including the signal transmitting and receiving unit 21, the distributing unit 22, the ONU buffer 23, the media access control unit 24, and the photoelectric converting unit 25; and a plurality of optical network units 4, each connected to the optical line terminal 2 and a user's terminal unit 5, the optical line terminal 2 and each of the optical network units 4 providing communication between the core network 1 and the users terminal unit 5. The optical network unit 4 includes: a transmission and receiving device including the electrical/optical converting unit 41, the media access control unit 42, and the electric side transmitting and receiving unit 43, a transmission control unit 40 configured to make a change in a transmission rate between the optical network unit 4 and the optical line terminal 2 on the basis of an instruction from the optical line terminal 2. The optical line terminal 2 includes: a storing unit 203 configured to store a transmission rate control information for specifying an upper limit of the communication bandwidth of each of the optical network units 4 in a normal status and a power saving status; and a time-division-multiplexing control unit 20 configured to instruct each of the optical network units 4 about an upstream transmission timing and an upstream transmission rate of transmitting the data toward the optical line terminal.

In response to a power saving mode signal, the time-division-multiplexing control unit 20 determines transmission clock rates providing communication bandwidths required in the normal status and the power saving status and a transmission order of the data from each of the optical network units with reference to the transmission rate control information, and transmits a notice message to each of the optical network units to instruct an upstream transmission timing after the change in the transmission rate and an upstream transmission clock rate after the change in the transmission rate and transmits the data to the optical network units in the determined transmission order of the data.

The power saving mode signal may be information from the batteries 9 and 10, and an EMS 6. However, an input signal to the optical line terminal 2 or a power saving signal generated in the optical line terminal when a predetermined status condition is satisfied, for example, when it is a night time zone.

The present invention is not limited to the embodiments described here and can be modified without departure from the sprit of the present invention.

The invention claimed is:

1. A passive optical network system comprising:
an optical line terminal; and
a plurality of optical network units connected to the optical line terminal, wherein at least one of the optical network units comprises:
a detecting unit configured to detect a decrease in a supply power to the optical network unit and inform the optical line terminal of the decrease in the supply power when the detecting unit detects the decrease,
a transmission control unit configured to make a change in a transmission rate between the optical network unit and the optical line terminal on the basis of an instruction from the optical line terminal,
wherein the optical line terminal comprises:
a storing unit configured to store a transmission rate control information for specifying an upper limit of the communication bandwidth of each of the optical network units in a normal status, a power failure status, and a power saving status; and
a time-division-multiplexing control unit configured to instruct each of the optical network units about an upstream transmission timing and an upstream transmission rate of transmitting the data toward the optical line terminal, and wherein, when the decrease in the supply power is informed by the optical network unit, the time-division-multiplexing control unit determines transmission clock rates providing communication bandwidths required in the normal status, the power failure status, and the power saving status and a transmission order of the data from each of the optical network units with reference to the transmission rate control information, and transmits a notice message to each of the optical network units to instruct an upstream transmission timing after the change in the transmission rate and an upstream transmission clock rate after the change in the transmission rate.

2. The passive optical network system as claimed in claim 1, wherein the optical line terminal comprises a time stamp control table configured to store a measured value of a round trip delay time between each of the optical network units and the optical line terminal and time stamp values defining upstream transmission timings as instructions for respective optical network units, and
wherein the time-division-multiplexing control unit instructs the optical network unit about a time stamp value obtained by subtracting the round trip delay time of the optical network unit from the time stamp value defining the transmission timing assigned to each of the optical network units.

3. The passive optical network system as claimed in claim 1, wherein the notice message includes specifying the optical network unit of a destination, specifying a downstream transmission clock rate for the data from the optical line terminal to the optical network unit after the change, specifying an allowable range of change time of a downstream transmission clock rate and an upstream transmission clock rate after the change, and specifying an allowable range of change time of an upstream transmission clock rate.

4. The passive optical network system as claimed in claim 1, wherein the time-division-multiplexing control unit determines a transmission order of data directed to a plurality of the optical network units so that pieces of the data directed to a part of the optical network units to be transmitted at the same transmission clock rate are continuously transmitted.

5. The passive optical network system as claimed in claim 1, wherein the time-division-multiplexing control unit transmits a dummy signal for clock synchronization between two adjacent pieces of data transmitted with different transmission clock rates.

6. The passive optical network system as claimed in claim 1, wherein the transmission control unit transmits an overhead signal for synchronizing the transmission clock just before the transmission data directed to the optical line terminal.

7. An optical line terminal connected to a plurality of optical network units in a passive optical network system, comprising:
a storing unit configured to store a transmission rate control information for specifying an upper limit of the communication bandwidth of each of the optical network units in a normal status, a power failure status, and a power saving status; and
a time-division-multiplexing control unit configured to instruct each optical network unit about an upstream transmission timing and an upstream transmission rate of time-division-transmitting data from each of the optical network units to the optical line terminal,
wherein, when the time-division-multiplexing control unit is informed of a detection of the decrease in supply power by any one of the optical network units, the time-division-multiplexing control unit determines change in clock rates providing communication bandwidths in the normal status, the power failure status, and the power saving status and a transmission order of the data from each of the optical network units with reference to the transmission rate control information, and transmits a notice message to each of the optical network units to instruct an upstream transmission timing after the change in the transmission clock rate and an upstream transmission clock rate after the change in the transmission clock rate.

8. The optical line terminal as claimed in claim 7, further comprising a time stamp control table configured to store a measured value of a round trip delay time between each of the optical network units and the optical line terminal and a time stamp value defining upstream transmission timing to be instructed to each of the optical network units,
wherein the time-division-multiplexing control unit instructs each of the optical network units about a time stamp value, as the upstream transmission timing, obtained by subtracting the round trip delay time of the optical network unit from the time stamp value defining the transmission timing assigned to each of the optical network units.

9. The optical line terminal as claimed in claim 7, wherein the time-division-multiplexing control unit determines a transmission order of data directed to a plurality of the optical network units so that pieces of the data directed to at least a part of the optical network units to be transmitted at the same transmission clock rate are continuously transmitted.

* * * * *